United States Patent
Varga et al.

(10) Patent No.: US 11,803,277 B2
(45) Date of Patent: Oct. 31, 2023

(54) GLAZING UNIT

(71) Applicant: SAINT-GOBAIN GLASS FRANCE, Courbevoie (FR)

(72) Inventors: Gabor Varga, Herzogenrath (DE); Bastian Klauss, Herzogenrath (DE); Michael Zeiss, Herzogenrath (DE); Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 384 days.

(21) Appl. No.: 17/272,841

(22) PCT Filed: Jul. 22, 2019

(86) PCT No.: PCT/EP2019/069655
§ 371 (c)(1),
(2) Date: Mar. 2, 2021

(87) PCT Pub. No.: WO2020/048672
PCT Pub. Date: Mar. 12, 2020

(65) Prior Publication Data
US 2021/0271343 A1 Sep. 2, 2021

(30) Foreign Application Priority Data
Sep. 3, 2018 (EP) .................................... 18192153

(51) Int. Cl.
*G06F 3/044* (2006.01)
*B32B 17/10* (2006.01)
(Continued)

(52) U.S. Cl.
CPC ...... *G06F 3/0443* (2019.05); *B32B 17/10036* (2013.01); *B32B 17/10183* (2013.01);
(Continued)

(58) Field of Classification Search
CPC ......... G06F 3/0443; G06F 2203/04105; B32B 17/10036; B32B 17/10183;
(Continued)

(56) References Cited

U.S. PATENT DOCUMENTS

| 4,554,493 A | * | 11/1985 | Armstrong | ............ | B60S 1/0822 |
| | | | | | 318/483 |
| 5,682,788 A | * | 11/1997 | Netzer | ................. | G01N 27/223 |
| | | | | | 324/687 |

(Continued)

FOREIGN PATENT DOCUMENTS

| CN | 101087135 A | 12/2007 |
| DE | 102 38 168 A1 | 8/2003 |

(Continued)

OTHER PUBLICATIONS

International Search Report as issued in International Patent Application No. PCT/EP2019/069655, dated Sep. 18, 2019.

*Primary Examiner* — Christopher E Leiby
(74) *Attorney, Agent, or Firm* — Pillsbury Winthrop Shaw Pittman LLP

(57) ABSTRACT

A glazing unit of a vehicle or building, which has at least one glass pane or polymer film, wherein a capacitive sensor is arranged on a first surface of the or a glass pane or polymer film, which sensor includes a first sensor section and a second sensor section spaced at a distance therefrom on the first surface, which second sensor section acts as a signal readout section, wherein during operation of the sensor, an electrical field is generated between the first and second sensor section, which field partially penetrates the glass pane or polymer film, wherein a material property compensation electrode is provided on the second surface of the same glass pane or polymer film, opposite the second sensor section.

9 Claims, 2 Drawing Sheets

Figure 1:
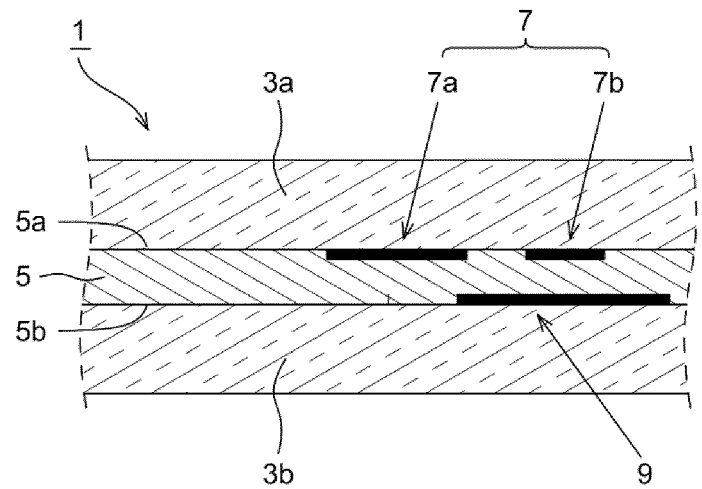

(51) Int. Cl.
*B60J 1/00* (2006.01)
*B60J 1/20* (2006.01)
*E06B 7/28* (2006.01)
*G01N 27/22* (2006.01)
*B60S 1/08* (2006.01)

(52) U.S. Cl.
CPC ......... *B32B 17/10761* (2013.01); *B60J 1/001* (2013.01); *B60J 1/20* (2013.01); *E06B 7/28* (2013.01); *G01N 27/223* (2013.01); *B32B 2419/00* (2013.01); *B32B 2605/006* (2013.01); *B60S 1/0825* (2013.01); *B60S 1/0877* (2013.01); *G06F 2203/04105* (2013.01)

(58) Field of Classification Search
CPC .......... B32B 17/10761; B32B 2419/00; B32B 2605/006; B60J 1/001; B60J 1/20; E06B 7/28; G01N 27/223; G01N 27/22; B60S 1/0825; B60S 1/0877
See application file for complete search history.

(56) References Cited

U.S. PATENT DOCUMENTS

| | | | |
|---|---|---|---|
| 6,094,981 A | 8/2000 | Hochstein | |
| 6,373,263 B1* | 4/2002 | Netzer | G01N 27/226 324/665 |
| 6,794,728 B1* | 9/2004 | Kithil | B60R 21/013 257/532 |
| 2007/0162233 A1* | 7/2007 | Schwenke | B60S 1/0822 702/3 |
| 2013/0019618 A1* | 1/2013 | Veerasamy | B60S 1/087 62/85 |
| 2019/0196624 A1* | 6/2019 | Otagaki | G06F 3/0447 |

FOREIGN PATENT DOCUMENTS

| | | |
|---|---|---|
| DE | 10 2008 043610 A1 | 5/2010 |
| EP | 1 686 026 A1 | 8/2006 |
| EP | 2 121 308 B1 | 2/2016 |

* cited by examiner

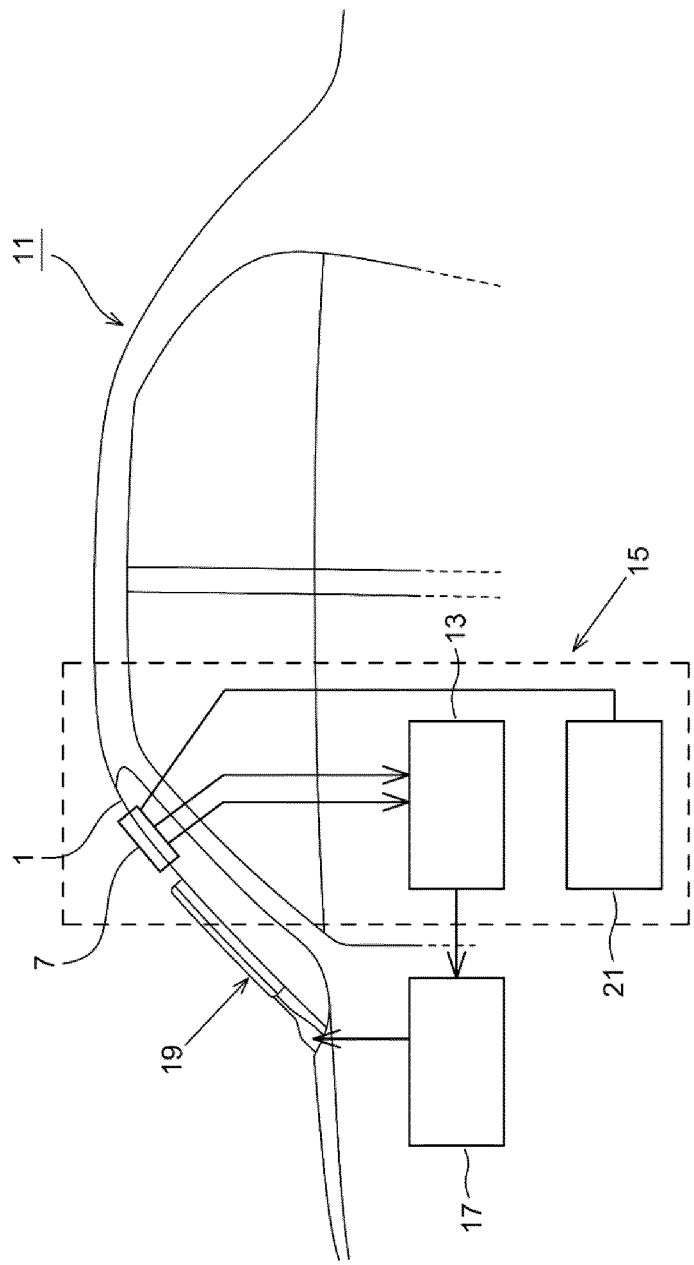

GLAZING UNIT

CROSS-REFERENCE TO RELATED APPLICATIONS

This application is the U.S. National Stage of PCT/EP2019/069655, filed Jul. 22, 2019, which in turn claims priority to European patent application number 18192153.7 filed Sep. 3, 2018. The content of these applications are incorporated herein by reference in their entireties.

DESCRIPTION

The invention relates to a glazing unit of a vehicle or building, which has at least one glass pane or polymer film, wherein a capacitive sensor is arranged on a first surface of the or a glass pane or polymer film, which sensor comprises a first sensor section and a second sensor section spaced apart therefrom on the first surface, which second sensor section acts as a signal readout section, wherein during operation of the sensor, an electrical field is generated between the first and second sensor section, which field partially penetrates the glass pane or polymer film. It further relates to a detection arrangement for capacitive detection of a physical variable on the inside and/or the outside of a vehicle window or building window or in its immediate environment.

In motor vehicles and buildings, the detection of conditions or parameters of the environment plays an increasing role for safe and efficient operation. Modern passenger cars as well as high-quality buildings are, consequently, equipped with a variety of sensors that detect relevant environmental conditions or parameters and deliver the current values to processing and control units that control functions of the vehicle or building. Incidentally, this applies not only to motor vehicles, but also to a certain extent to certain watercraft.

Certain sensors can advantageously be placed on or in the windshield or, optionally, also the rear window or a glass roof unit of a passenger car. Such arrangements have long been known for so-called "rain sensors", via which the wiper functions of the vehicle are controlled. In the context of the general trend toward largely complete prefabrication of vehicle components, there are developments targeting integration of such sensors in a prefabricated glazing unit (such as the front or rear window) of a vehicle. Corresponding solutions are mentioned in the unpublished European patent application No. 17192877.3. Vehicle panes with integrated or partially integrated sensors are also known from EP 2 121 308 B1 or CN 101 087 135 A.

The function of capacitive sensors widely used in particular as so-called "rain sensors" (or also as "touch sensors") is based on generating an electrical field between two electrodes arranged at a distance from one another on a substrate and its being influenced by the physical variable to be measured. Its influence is, however, often distorted to a large extent by interference effects. In particular, the measurement signal of such sensors is highly dependent on the permittivity (dielectric conductivity) of the substrate, which, in turn, exhibits significant temperature dependence. As a result, it is necessary either to accept limited validity of the sensor signals or to provide complex additional measurement and processing equipment for parallel and/or subsequent compensation of the interference effects. Of course, this increases the effort involved in such a detection arrangement and thus its costs.

Starting from the prior art, the object of the invention is to provide a glazing unit of the type mentioned in the introduction, with which higher validity and reliability of the data obtained with the built-in sensor system can be achieved. Furthermore, a correspondingly improved detection arrangement is to be provided.

This object is accomplished with regard to the glazing unit by a glazing unit with the features of claim 1 and with regard to the detection arrangement by a detection arrangement with the features of claim 9. Expedient further developments of the concept of the invention are the subject matter of the respective dependent claims.

In the context of the invention, the term "glazing unit" is to be understood in the general sense of a product that can be used to close window openings of a vehicle or building directly (frameless) or after insertion into a suitable frame. In modern motor vehicles, this usually means composite glass panes; and in new buildings in middle and northern latitudes, insulating glazing units; however, the invention is not limited to such. Instead, it can also be used with simple single-pane glazing units or multipane glazing units that have a special structure, such as in glazing units for armored vehicles or for explosion-proof rooms. The panes of the glazing unit also do not necessarily have to be made of glass, but at least a part thereof can also be made of a transparent plastic, such as polycarbonate.

Here, a "capacitive sensor" is, in a general sense, understood to mean one whose function is based on the generation and detection of changes in an electrical field due to the relevant physical variable and in which the detection result is influenced by the permittivity of a substrate of the sensor. In an application of particular practical importance in automotive engineering, this is a moisture or "rain" sensor; however, a capacitive sensor can also be used to detect other variables in or on a vehicle or building.

The invention first includes the idea of a deliberate departure from the usual practice of after-the-fact mathematical compensation of conductivity or temperature influences in the signals of a capacitive sensor. It further includes the idea of, instead, undertaking physical compensation acting directly on the sensor arrangement. The invention further includes the idea of undertaking this sensor-inherent compensation by means of an additional electrode and the establishment of an additional electrical field that penetrates the sensor substrate and is thus influenced by the permittivity of the substrate and its changes in the same way as the actual measurement signal.

The invention makes it possible, with little additional effort in the manufacturer of the sensor device, to save significant effort for after-the-fact signal compensation in the detection arrangement and to save the corresponding costs. In addition, based on its principle, direct sensor-inherent compensation is superior to after-the-fact mathematical compensation and fundamentally provides more accurate results.

In a practically important embodiment of the invention, the glazing unit is implemented as a composite glass pane, having a first and second glass pane and a polymer film bonded therebetween, wherein the first and second sensor section is arranged on the inner surface of the first glass pane, adjacent the first surface of the polymer film, and the material property compensation electrode is arranged on the inner surface of the second glass pane, adjacent the second surface of the polymer film.

The polymer film is considered a property-critical part of a capacitive sensor system installed in a composite glass pane; and in the proposed embodiment, it is provided with
} the additional electrode on the side facing away from the sensor. However, for technical reasons, the electrodes of the actual sensor and the compensation electrode are preferably applied on the adjacent (inner) glass surfaces.

If, on the other hand, the outer glass pane of the composite glazing is the part whose permittivity has the critical influence on the capacitance measurement signal, the material property compensation electrode must be placed on the outer surface of this glass pane. Overall, it should be pointed out that in the case of multilayer glazings, a whole group of possibilities exist with regard to the critical layer(s) in each case and the location of the application of the material property compensation electrode must be selected depending on the dielectric properties of which layer(s) are to be inherently compensated by the use of this additional electrode.

In another embodiment, the glazing unit is a single-pane glazing unit, wherein the first and second sensor section are arranged on the first surface and the material property compensation electrode is arranged on the second surface of the single glass pane. Here, the critical sensor material component is the glass, and the sensor sections or the compensation electrode are also formed directly thereon.

In an embodiment that is currently particularly significant from a practical standpoint, the capacitive sensor is implemented as a moisture sensor for sensing moisture on the inside and/or the outside of the glazing unit or its respective environment.

However, as already mentioned above, capacitive sensors are also used for detecting other physical variables, and the invention is also useful for such other intended applications.

Due to current technical considerations, embodiments are preferred in which the first and second sensor section and/or the material property compensation electrode has a conductive structure printed or glued onto the respective surface of the glass pane or polymer film or onto a surface of another component adjacent thereto. Specifically, the printed or glued-on conductor structure can be transparent at least in sections.

The proposed detection arrangement includes, in addition to a glazing unit, as explained by way of example above, a voltage supply unit and a readout and evaluation device. The voltage supply unit is connected to the second sensor section of the capacitive sensor and to the material property compensation electrode and is designed for applying the same potential to the second sensor section and to the material property compensation electrode. The readout and evaluation device is designed to read out a capacitance signal from the second sensor section of the capacitive sensor and to process this signal to determine a value of the physical variable.

The readout and evaluation device is, in particular, designed such that it can also take into account a voltage signal or a voltage change originating from the material property compensation electrode on the opposite side of the relevant material layer and which reflects the change in its relevant material property (in particular, the permittivity).

Figure 2:
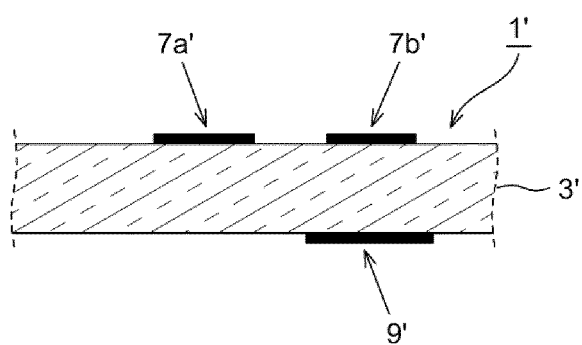

Advantages and expediencies of the invention are also apparent from the following description of exemplary embodiments with reference to the figures. They depict:

FIG. 1 a first embodiment of the glazing unit according to the invention in a schematic cross-sectional representation;

FIG. 2 a second embodiment of the glazing unit according to the invention in a schematic cross-sectional representation;

FIG. 3 a schematic representation of an embodiment of the detection arrangement according to the invention in the form of a block diagram.

FIG. 1 depicts, schematically in a detail, a glazing unit 1 implemented as a composite glass pane, as it can be used, for example, as a windshield unit of a passenger car. The glazing unit 1 comprises a first (outer) glass pane 3a and a second (inner) glass pane 3b and a PVB film 5 bonded therebetween (with adhesive layers not separately marked).

In the region depicted, the glazing unit 1 is provided with a moisture sensor 7, which comprises a first sensor section 7a and a second sensor section 7b. The sensor sections 7a, 7b are depicted purely symbolically here. Since such capacitive moisture sensors have long been known and are in mass use, they are known in detail to the person skilled in the art and, consequently, need no more precise description here.

The figure shows that the first and second sensor section 7a, 7b are arranged between a first surface 5a of the PVB film 5 and the inner surface of the adjacent glass pane 3a. In practice, the sensors typically have conductor structures printed or glued onto the respective glass surface. Depending on the specific embodiment of the glazing unit with integrated sensors, the conductor tracks can be at least partially transparent, made, for example, of ITO (indium tin oxide) or transparent metallic silver layers or conductive polymers. Opposite the second sensor section 7b and covering its surface, a material property compensation electrode 9 is attached to the inner side of the second glass pane 3b and thus to the second surface 5b of the PVB film 5.

This additional electrode is, during operation of the moisture sensor 7, connected to the same potential as the second sensor section 7b of the moisture sensor 7, which acts here as a signal acquisition sensor. When an electrical field formed in the usual manner penetrates the PVB film 5 between the sensor sections 7a, 7b, changes in the electrical properties, specifically in the permittivity, of the PVB film (e.g., as a result of temperature changes) are compensated in a sensor-inherent manner in that an electrical field is also formed between the first sensor section 7a and the material property compensation electrode 9 and this field is influenced by the change in permittivity of the PVB film in the same way as the field between the sensor sections 7a, 7b.

It should be noted that the above specification of the sensors 7a, 7b is merely by way of example and provision of shielding electrodes or shielding surfaces dedicated in each case can also be useful for capacitive sensors with a different detection function and, more generally, for other types of sensors that are influenced by changes in the electrical properties of a sensor substrate during operation of the sensor device.

FIG. 2 depicts an embodiment modified compared to the first embodiment, namely in a single pane glazing unit 1', as can be used in vehicle construction in side windows or in construction engineering, for example, in interior windows outbuildings or in exterior windows of buildings in subtropical or tropical regions. Here, the glazing unit 1' comprises a single glass pane 3', and, on both its surfaces, sensor sections 7a', 7b' and material property concentration electrode 9' with the functions or specifications explained above are applied.

FIG. 3 shows schematically that a glazing unit 1 of the type depicted in FIG. 1 with an integrated sensor system 7 in the vehicle 11 forms, together with an evaluation unit 13, a moisture detection arrangement 15. The detection arrangement 15 is connected on the output side to a wiper control unit 17, which controls the wipers 19 of the vehicle 11 in a manner known per se as a function of the moisture signals detected.

According to the invention, the detection arrangement 15 includes a specially designed voltage supply unit 21, which is designed to apply the same potential to the second sensor section and the material property compensation electrode (see FIG. 1) of the sensor system 7. Provided for this, within the glazing unit and between it and the voltage supply unit (for example, in the region of the dashboard or the vehicle roof), are a first connecting line for connection of the first sensor section to a first supply potential and a second connecting line for the common connection of the second sensor section and the material property compensation electrode to the second supply potential. In the simplest case, the supply potentials are temporally constant but can, if necessary, depending on a special sensor structure and special sensor functions also have a predefined temporal dependency. Within the glazing unit, the first and second connecting line can, in particular, be implemented as glued-on or printed, in particular transparent, conductors.

The evaluation unit 13 can be designed to take into account a voltage signal originating from the material property compensation electrode in conjunction with the actual readout signal from the second sensor section.

The implementation of the invention is not restricted to the examples and aspects emphasized here but is also possible in a variety of modifications, which are within the scope of the appended claims.

LIST OF REFERENCE CHARACTERS

1; 1' glazing unit
3a, 3b; 3' glass pane
5 PVB film
5a, 5b first and second surface of the PVB film
7 moisture sensor (sensor system)
7a, 7b; 7a', 713' first and second sensor
9; 9" material property compensation electrode
11 vehicle
13 differential evaluation unit
15 detection arrangement
17 windshield wiper control
19 windshield wiper
21 voltage supply unit

The invention claimed is:

1. A glazing unit of a vehicle or building, which has at least one glass pane or polymer film, wherein a capacitive sensor is arranged on a first surface of the glass pane or polymer film, which sensor comprises a first sensor section and a second sensor section spaced at a distance therefrom on the first surface, which second sensor section acts as a signal readout section, wherein during operation of the sensor, an electrical field is generated between the first and second sensor section, which field partially penetrates the glass pane or polymer film,
   wherein a material property compensation electrode is provided locally on the second surface of the same glass pane or polymer film, opposite the second sensor section, and
   wherein the glazing unit comprises a first connecting line that is connected to the first sensor section to apply a first potential to the first sensor section and a common second connecting line that is connected to both the second sensor section and the material property compensation electrode to apply a same second potential to both the second sensor section and the material property compensation electrode.

2. The glazing unit according to claim 1, implemented as a composite glass pane, which has a first and second glass pane and a polymer film bonded therebetween, wherein the first and second sensor section are arranged on an inner surface of the first glass pane, adjacent the first surface of the polymer film, and the material property compensation electrode is arranged on an inner surface of the second glass pane, adjacent the second surface of the polymer film, or on an outer surface of the second glass pane.

3. The glazing unit according to claim 1, implemented as a single-pane glazing unit, wherein the first and second sensor section are arranged on the first surface and the material property compensation electrode is arranged on the second surface of the single glass pane.

4. The glazing unit according to claim 1, wherein the capacitive sensor is implemented as a moisture sensor for sensing moisture on the inside and/or the outside of the glazing unit or its respective environment.

5. The glazing unit according to claim 1, wherein the capacitive sensor is implemented as a touch sensor for detecting touches or the application of pressure on the inside and/or the outside of the glazing unit.

6. The glazing unit according to claim 1, wherein the first and second sensor section and/or the material property compensation electrode and the optionally provided first and second connecting line have a conductor structure printed or glued onto the respective surface of the glass pane or polymer film or onto a surface of another component adjacent thereto.

7. The glazing unit according to claim 6, wherein the printed or glued-on conductor structure is transparent at least in sections.

8. A detection arrangement for capacitive detection of a physical variable on the inside and/or the outside of a vehicle window or building window or in its immediate environment, comprising:
   a glazing unit according to claim 1 for forming the vehicle window or building window, and
   a voltage supply unit connected to the second sensor section of the capacitive sensor and to the material property compensation electrode voltage supply unit, which is designed for applying the same potential to the second sensor section and to the material property compensation electrode, and
   a readout and evaluation device for reading a capacitance signal from the second sensor section of the capacitive sensor and for processing the signal to determine a value of the physical variable,
wherein the readout and evaluation device is implemented to take into account a voltage signal originating from the material property compensation electrode.

9. A vehicle with a detection arrangement according to claim 8.

* * * * *